(12) United States Patent
Bombeck et al.

(10) Patent No.: US 9,737,081 B2
(45) Date of Patent: Aug. 22, 2017

(54) HOT BEVERAGE BREWING SYSTEM AND USE THEREOF

(71) Applicant: Alpha Dominche Ltd., Salt Lake City, UT (US)

(72) Inventors: Khristian Bombeck, Bozeman, MT (US); Casey Dodge, Bozeman, MT (US); Casey Smith, Bozeman, MT (US)

(73) Assignee: ALPHA DOMINCHE HOLDINGS, INC., Dallas, TX (US)

( * ) Notice: Subject to any disclaimer, the term of this patent is extended or adjusted under 35 U.S.C. 154(b) by 69 days.

(21) Appl. No.: 14/253,487

(22) Filed: Apr. 15, 2014

(65) Prior Publication Data

US 2014/0227413 A1    Aug. 14, 2014

Related U.S. Application Data

(62) Division of application No. 13/403,095, filed on Feb. 23, 2012, now Pat. No. 8,739,689.

(60) Provisional application No. 61/447,009, filed on Feb. 26, 2011.

(51) Int. Cl.
*A23F 3/18* (2006.01)
*A47J 31/30* (2006.01)
*A47J 31/053* (2006.01)
*A47J 31/043* (2006.01)
*A23F 5/26* (2006.01)

(52) U.S. Cl.
CPC ............. *A23F 3/18* (2013.01); *A23F 5/262* (2013.01); *A47J 31/043* (2013.01); *A47J 31/053* (2013.01); *A47J 31/30* (2013.01)

(58) Field of Classification Search
CPC .......... A23F 3/18; A23F 5/262; A47J 31/04–31/053; A47J 31/24–31/3695; A47J 31/4489
USPC .......... 426/431–435, 594–597, 511, 520; 99/280–283, 292–294, 297, 299, 316, 99/323, 323.1, 323.3
See application file for complete search history.

(56) References Cited

U.S. PATENT DOCUMENTS

| 1,687,095 | A | * | 10/1928 | Jones | A47J 31/007 426/433 |
|---|---|---|---|---|---|
| 1,751,477 | A | * | 3/1930 | Greenwald | A47J 31/007 426/433 |
| 2,097,681 | A | * | 11/1937 | Wolcott | A47J 31/047 200/18 |
| 2,331,705 | A | * | 10/1943 | Lehmann | A47J 31/043 210/481 |

(Continued)

*Primary Examiner* — Drew Becker
(74) *Attorney, Agent, or Firm* — Phillips Ryther & Winchester; Matthew D. Thayne (57) ABSTRACT

In described embodiments, a hot liquid extraction system includes a vessel, a controllable steam and water source external from the vessel which heats the liquid of the corresponding vessel, a filter assembly disposed within the vessel operable to filter and remove a solid from the brewed beverage, and a valve to dispense the filtered beverage from the base of the brew vessel. Some embodiments include one or more valves operable to regulate water flow and steam into the brewing vessel, and a filter operable to separate a brewed liquid from a flavor base and to remove a spent flavor base from the system. Some embodiments include processor control of the system, allowing for operation tailored to individual user requirements that might be downloaded to the processor through various wired and non-wired interfaces.

16 Claims, 6 Drawing Sheets

(56) References Cited

U.S. PATENT DOCUMENTS

| | | | | |
|---|---|---|---|---|
| 2,577,990 A * | 12/1951 | Ziskin | A47J 31/043 | 210/118 |
| 2,745,333 A * | 5/1956 | Campbell | A47J 31/047 | 99/281 |
| 2,783,703 A * | 3/1957 | Brown | A47J 31/56 | 137/268 |
| 2,844,088 A * | 7/1958 | Von Wertaur | A47J 31/043 | 99/292 |
| 3,111,079 A * | 11/1963 | Lescure | A47J 31/303 | 99/285 |
| 3,615,665 A * | 10/1971 | White | A23F 5/04 | 426/386 |
| 4,143,589 A * | 3/1979 | Weber | A47J 31/32 | 99/282 |
| 5,267,506 A * | 12/1993 | Cai | A47J 31/30 | 99/280 |
| 5,403,605 A * | 4/1995 | Smith | A47J 31/002 | 426/433 |
| 7,104,185 B2 * | 9/2006 | Leung | A47J 31/043 | 99/292 |
| 7,458,316 B2 * | 12/2008 | Scelza | A47J 31/005 | 126/609 |
| 8,387,516 B1 * | 3/2013 | Reynolds | A47J 31/56 | 137/268 |
| 8,889,207 B2 * | 11/2014 | Aigner | A47J 31/60 | 426/112 |
| 2003/0157226 A1 * | 8/2003 | Leung | A47J 31/0615 | 426/433 |
| 2008/0063772 A1 * | 3/2008 | Kirschner | A23F 3/18 | 426/523 |
| 2009/0117240 A1 * | 5/2009 | Crescenzi | A47J 31/32 | 426/433 |
| 2009/0223376 A1 * | 9/2009 | Navarini | A47J 31/4496 | 99/293 |
| 2011/0097466 A1 * | 4/2011 | Vastardis | A47J 31/4403 | 426/433 |
| 2012/0093990 A1 * | 4/2012 | Shrader | A47J 31/32 | 426/433 |

* cited by examiner

HOT BEVERAGE BREWING SYSTEM AND USE THEREOF

CROSS-REFERENCE TO RELATED APPLICATIONS

This application is a divisional application of U.S. patent application Ser. No. 13/403,095 filed 23 Feb. 2012, now U.S. Pat. No. 8,739,698 and claims the benefit of the filing date of U.S. provisional application No. 61/447,009, filed on Feb. 26, 2011, the teachings of which are incorporated herein in their entireties by reference.

BACKGROUND OF THE INVENTION

Field of the Invention

The present invention relates to an apparatus for brewing a beverage.

Description of the Related Art

A typical siphon coffee maker brews coffee using two chambers where vapor pressure and vacuum produce coffee. There have been many variations of this type of coffee maker, also known as vacuum pot coffee maker, siphon coffee maker and vacuum coffee maker. Similar systems can be used for brewing other liquids by extraction into hot liquid.

U.S. Pat. No. 7,673,555 discloses a machine for brewing a beverage that uses a mechanically operated piston to force a brewed beverage through filter for dispensing. The piston moves in an upward direction, forcing the beverage, which is in a closed volume, through check valves in the piston and to a volume below the piston for dispensing to a user. Drawbacks to this type of machine include added costs tor the mechanically operated piston, as well as the potential for the piston to jam, thereby rendering the machine useless.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a machine for brewing a beverage. The machine includes a brew chamber and a steam chamber disposed below the brew chamber, such that the steam chamber is in fluid communication with the brew chamber. A filtering base is removably inserted into the brew chamber. The machine further includes a boiler having a steam outlet in fluid communication with the steam chamber and a heated water outlet in fluid communication with the steam chamber. A fresh water supply conduit is in fluid communication with the boiler and with the heated water outlet.

Further, the present invention provides a method of brewing a beverage. The method provides a heated fluid into a lower chamber and an agitation fluid into the lower chamber, such that the agitation fluid forces the heated fluid into an upper chamber. The agitation fluid is then let into the upper chamber. A flavor base is added into the upper chamber. The heated fluid is combined with the flavor base, forming a brewed beverage. The brewed beverage is then dispensed.

Additionally, the present invention includes a machine for brewing a beverage. The machine includes an upper chamber having a lower end and an upper end. A filtering base is disposed inside the upper chamber and movable between the lower end and the upper end. A lower chamber is disposed below the upper chamber. A conduit provides for fluid. communication between the lower chamber and the upper chamber. The machine further includes a heater having a hot water outlet in communication with the lower chamber.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

A typical, non-limiting embodiment of the present invention includes a machine for brewing a beverage such as, but not limited to, coffee or tea, that includes a brew vessel and a plunger disposed in the brew vessel. The brew vessel is operable to receive a liquid such as water, a flavor base such as ground coffee or tea, and to allow the beverage to brew from a mixture of the liquid and the base. The plunger assembly is operable to filter a solid, such as spent coffee grounds or tea from the brewed beverage and to remove the spent flavor base from the brew vessel. Steam pressure from an external boiler is operable to power a siphon brewer which relatively decreases the time traditionally required to brew siphon beverages, and introduces a. new means to control many factors of the brew cycle, Regulation of steam pressure controls agitation of the brewing liquid, and might be employed to terminate the brewing process. Valves, either manual or electric, are used to precisely control the flow of water and steam from the boiler. The precise control of these valves provides for accurate achievement of the brew temperature, brew time, brew volume, and brew agitation. A valve on the bottom of the brew vessel allows liquid to drain from the brew vessel. In some embodiments, brewing automation is provided by means of a user interface through which a microprocessor is controlled. The microprocessor controls the water valve and the steam valve to achieve unique brew settings for each brew vessel.

Referring in general to FIGS. 1-7C, this discussion is of the embodiment of machine 17 for brewing beverages that further develops the well-known art of siphon brewing. Furthermore, this machine 17 may provide a new level of precision, customization, and efficiency to the siphon brewing method. The embodiment of this machine 17 uses boiler 2 with heat exchange technology, although heat exchangers are not necessary, to power one or many siphon style brew vessels 9. To separate the beverage from the flavor base, the inventive machine 17 uses plunger 11 with filtering base 12 similar in configuration to the plunger apparatus used by the well-known French press brew method. However, in contrast to the French press method, with the present invention, the spent flavor base is left atop the plunger's filter base 12.

Figure 1:
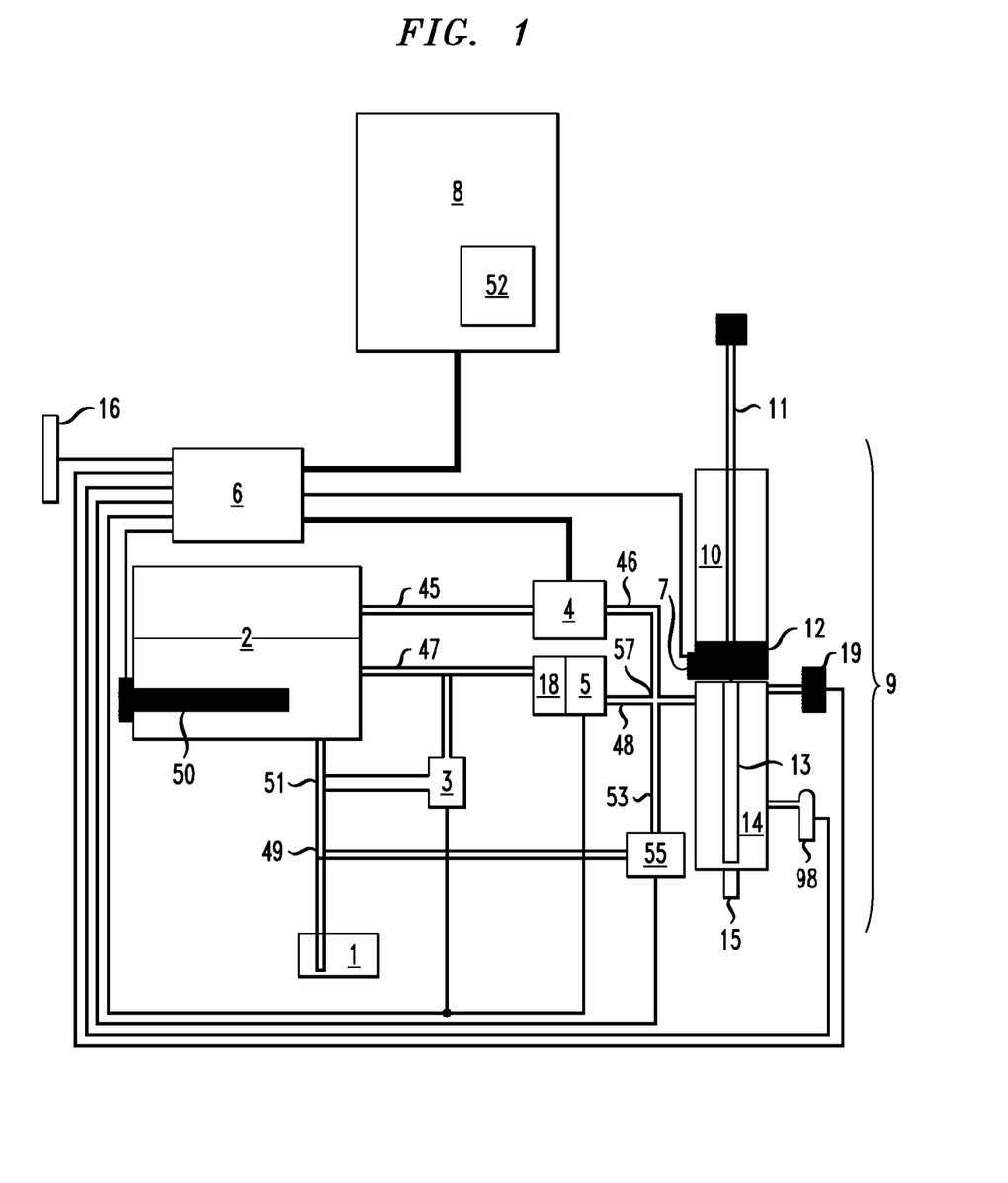
FIG. 1 shows a block diagram of a machine for brewing beverages such as coffee or tea or according to an exemplary embodiment of the invention.

Furthermore, boiler 2 is employed to preheat the water for each brew. Flow meters 5 and valves 4, 18 initiate and control the brew process with a relatively high degree of precision. Steam from the boiler 2 is used to generate pressure, which forces water in the brew vessels' steam chamber 14 upward into the brew chamber 10 of the brew vessel 9. The steam pressure from the boiler 2 is then controlled with a valve 4 in order to heat the brew water in the brew chamber 10 to a user's specified temperature. The incoming steam pressure is further regulated to maintain the desired brew temperature, control agitation of the brewing liquid, and to terminate the brewing process. The machine 17 allows for automation of one or all steps of the siphon brewing technique. Such a machine may control one or more of the brewing parameters with a level of precision that yields brewed coffee having a customizable taste from cup to cup. Furthermore, such a machine may siphon brew with a speed and efficiency that renders the machine suitable for use in a high volume commercial settings. In addition, such a machine may allow one to easily change the brewing recipe from brew to brew, where the recipe may be customized by a customer to the customer's preferences.

Figure 2:
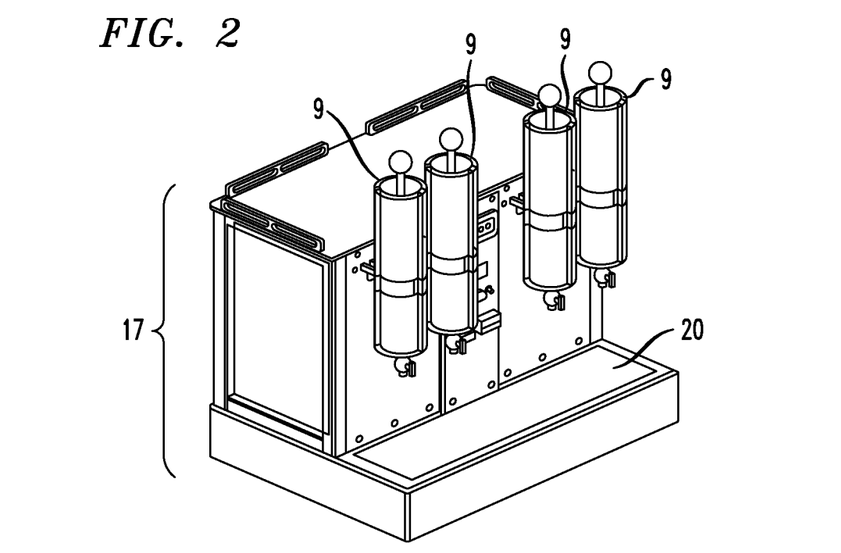
FIG. 2 shows a front perspective view of the same embodiments of the invention disclosed here as depicted in FIG. 1.
Figure 3:
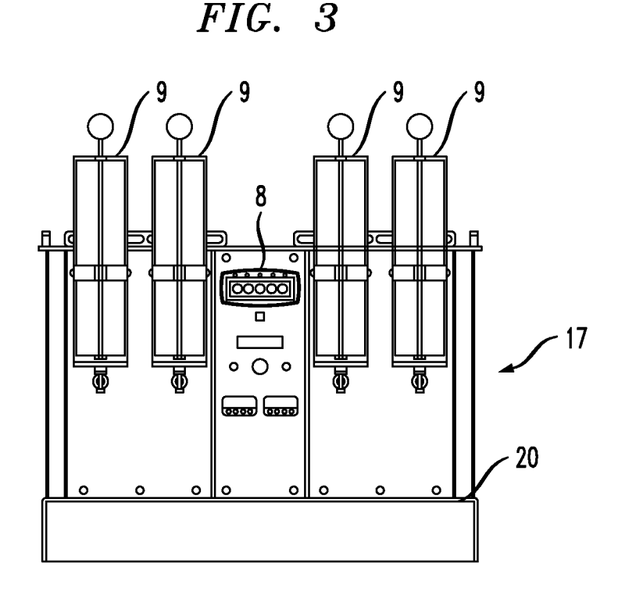
FIG. 3 shows an front elevation view of the machine disclosed here and as depicted in FIG. 2.
Figure 4:
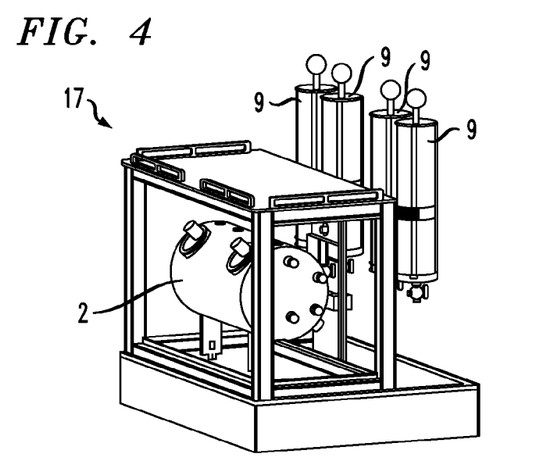
FIG. 4 shows a rear perspective view of the machine disclosed here and as depicted in FIG. 2.

The embodiment of this machine may include but is not limited to one or more of the following components: brew vessel 9, boiler 2, temperature sensor 7, flow meter 5, steam control valve 4, water control valve 18, cooling water mixer valve 3, microprocessor-controller 6, user interface 8, fresh water inlet valve 1, and network communication port 16. While, as shown in FIGS. 2-4, four brew vessels 9 may be used with machine 17, those skilled in the art will recognize that more or less than four brew vessels 9 might be incorporated into machine 17. For ease of description, only a single brew vessel 9 will be discussed.

Figure 5:
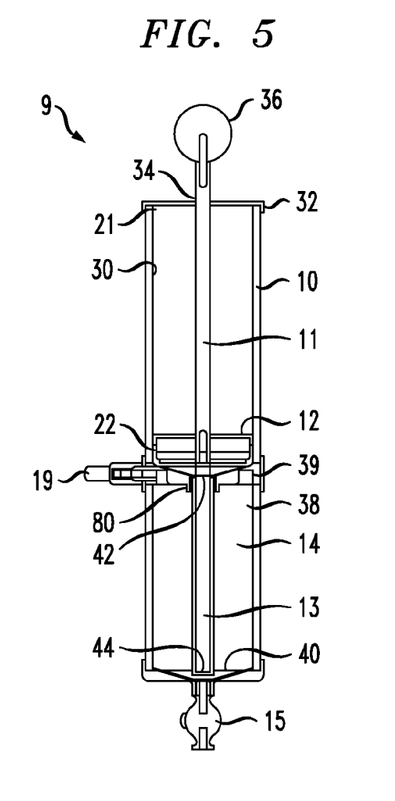
FIG. 5 shows a sectional view of a brew vessel used in the machine disclosed here and as depicted in FIG. 1.

Referring specifically to FIG. 5, brew vessel 9 includes an upper, or brew, chamber 10 having an upper end 21 and a lower end 22. in an exemplary embodiment, brew vessel 9 might have approximate volume of about 20 ounces. Filtering base 12 is coupled to elongated plunger 11 and is removably inserted into brew vessel 9. Filtering base 12 receives and retains a flavor base, such as, for example, coffee grounds or tea leaves. In an exemplary embodiment, shown in FIG. 6, filtering base 12 includes between about 1 and about 10 layers of filter media, which can be constructed from a wire mesh or otherwise porous metal having pore sizes of between about 0.005 and about 0.125 inches in diameter.

Figure 6:
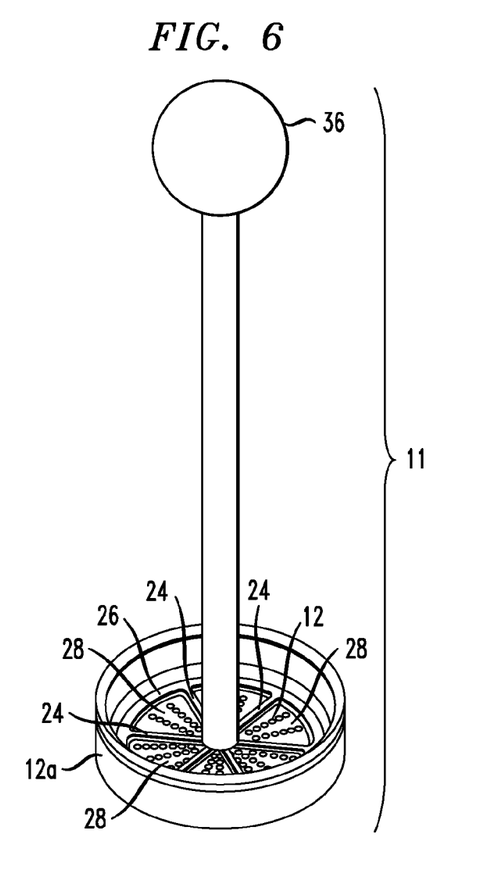
FIG. 6 shows a perspective view of a plunger used in the machine disclosed here and as depicted in FIG. 1.

Filtering base 12 may include a plurality of spokes 24 extending outwardly from plunger 11 to at least one annular flume 26. Openings 28 between the spokes 24 allow the brewing liquid to pass through filtering base 12. The filter media, however, prevents the flavor base from passing downward below filtering base 12. Annular frame 26 and filtering base 12 form an open reservoir to receive and retain the flavor base and to prevent solid elements of the flavor base from escaping from the brew chamber 10 during and after the brewing process.

Referring specifically to FIG. 5, filtering base 12 is movable through the brew chamber 10 between the lower end 22 in an operational mode and the upper end 21 in a cleaning mode. Filtering base 12 is sized so that, while being easily movable between the lower end 22 and the upper end 21, the outer perimeter of the filtering base 12 snugly engages the inner sidewall 30 of the brew chamber 10 so that the flavor-base or brewing water is substantially unable to leak or otherwise bypass filtering base 12 during the brewing process. The outer perimeter of filtering base 12 may include a lubricious material, such as, for example, TEFLON®, which facilitates a sliding, yet sealing, engagement of filtering base 12 with inner sidewall 30 of brew chamber 10. Alternatively, filtering base 12 may include at least one O-ring 12a that extends around the perimeter of filtering base 12 and serves to seal filtering base 12 against inner sidewall 30 of brew chamber 10.

Figure 6A:
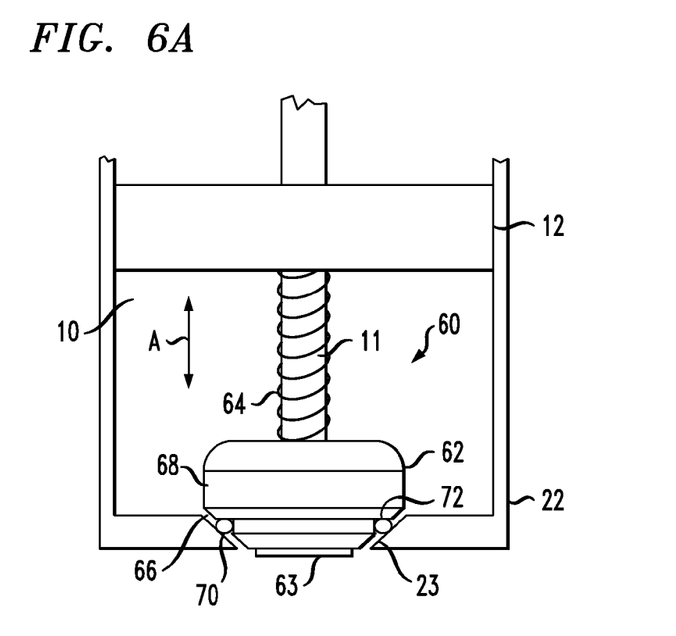
FIG. 6A shows a perspective view of a lower end of the plunger of FIG. 6.

Referring to FIG. 6A, check valve assembly 60 may be used at the bottom of filtering base 12 to seal lower end 22 of brew chamber 10. Check valve assembly 60 is adapted to operate between an open position wherein fluid passes between brew chamber 10 and steam chamber 14 and a closed position wherein fluid in brew chamber 10 is retained in brew chamber 10. Check valve assembly 60 includes valve 62 that is slidingly disposed around plunger 11 and moves along plunger 11 in the direction identified by arrow "A". Biasing member 64, such as, for example a helical spring, biases valve 62 away from filtering base 12 and toward lower end 22 of brew chamber 10. Lip 63 prevents valve 62 from falling off of plunger 11. When plunger 11 is fully lowered into brew chamber 10, valve 62 seals brew chamber 10 from steam chamber 14. Valve 62 includes sealing surface 66 that extends at about a 45° angle relative to a vertical surface 68 of valve 62. O-ring 70 extends around slot 72 formed in sealing surface 66 to enhance the sealing of valve 62 with tower end 22 of brew chamber 10. Lower end 22 of brew chamber 10 includes a tapered opening 23 into which sealing surface 66 seats when check valve assembly 60 is in the closed position.

Biasing member 64 is sized such that, when sufficient steam pressure from steam chamber 14 engages valve 62, biasing member 64 yields, thereby allowing the steam to push valve 62 upward along plunger 11 and allow the steam to enter brew chamber 10. When the steam pressure is released, biasing member 64 forces valve 62 downward along plunger 11, sealing brew chamber 10 and preventing any liquid in brew chamber 10 from flowing out of brew chamber 10 and into steam chamber 14.

Lid 32 is removably disposed over the upper end 21 of brew chamber 10. Lid 32 includes a centrally located opening 34 through which the plunger 11 extends. Lid 32 may rest on the brew chamber 10 by action of gravity or, alternatively, a locking mechanism, such as, for example, a threaded connection (not shown), may secure the lid 32 to the upper end 21 of brew chamber 10.

Plunger 11 is sufficiently long such that, when the filtering base 12 is disposed in the lower end 22 of the brew chamber 10, a significant length of plunger 11 extends outwardly from the upper end 21 of brew chamber 10 and through lid 32 so that a user may be able to grasp plunger 11 and lift plunger 11 and filter base 12 toward the upper end 21 of brew chamber 10. Optionally, plunger 11 might include device 36, such as a handle or knob, at an upper end thereof to facilitate grasping plunger 11.

Brew vessel 9 further includes lower, or steam, chamber 14 located physically below brew chamber 10. Steam chamber 14 includes an upper end 38 and a bottom end 40. In an exemplary embodiment, steam chamber 14 might have approximate volume of about 24 ounces. A conduit, such as straw 13, having a first, or top, open end 42 and a second, or bottom, open end 44, distal from the first open end 42, extends downward from lower end 22 of brew chamber 10 and through the upper end 38 of steam chamber 14 toward the bottom end 40 of steam chamber 14, but generally does not physically contact the bottom end 40, so that at least a small volume is present between the straw 13 and the bottom end 40 of steam chamber 14.

Figure 7:
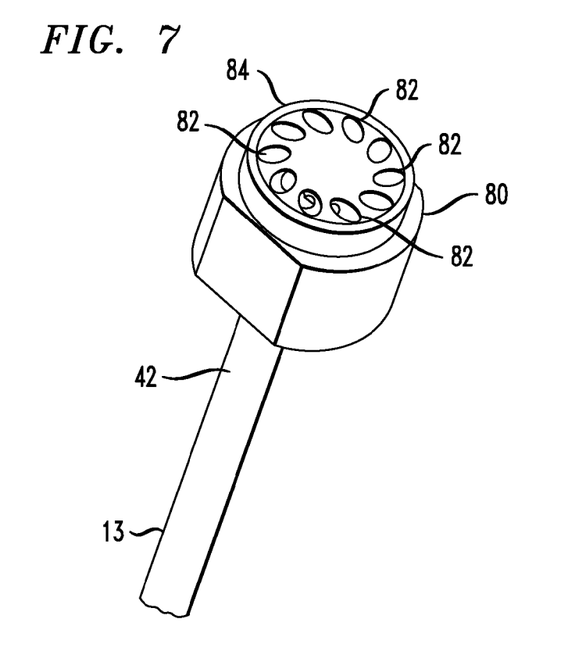
FIG. 7 shows a perspective view of an upper end of a fluid conduit use of the machine disclosed herein as depicted in FIG. 1.
Figure 7A:
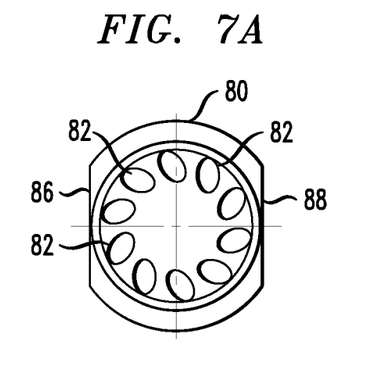
FIG. 7A shows a top plan view of the upper end of the fluid conduit of FIG. 7.
Figure 7B:
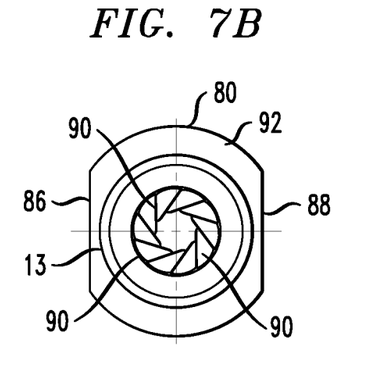
FIG. 7B shows a bottom plan view of the fluid conduit of FIG. 7.
Figure 7C:
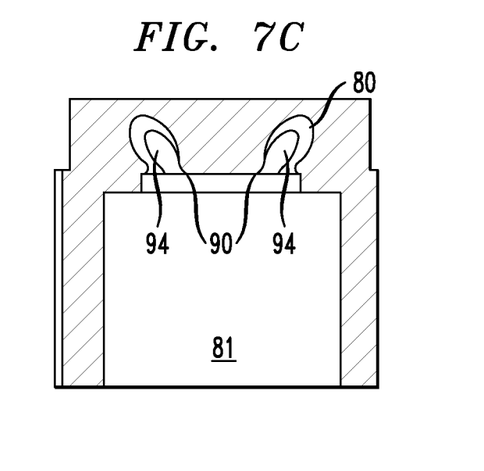
FIG. 7C shows a sectional view of the upper end of the fluid conduit of FIG. 7.

In an exemplary embodiment, top end 42 of straw 13 might include spray tip fitting 80, shown in FIGS. 5 and 7-7C through which fluid flowing through straw 13 passes prior to entering brew chamber 10. Spray tip fitting 80 includes recessed area 81 in which top end 42 of straw 13 is inserted.

As shown in FIGS. 7-7B, spray tip fitting 80 includes a plurality of outlet openings 82 extending radially around perimeter 84 thereof. In the exemplary embodiment shown FIG. 7, ten outlet openings 82 are shown, although those skilled in the art will recognize that more or less than ten passages can be used. Outlet openings 82 direct fluid flowing upward through straw 13 outwardly upon leaving spray tip fitting 80, thereby generating a tornado-like or vortex effect of the fluid, which serves several purposes. A first purpose is to help increase agitation of the fluid inside brew chamber 10, thereby increasing the growing efficiency of machine 17. Additionally, outlet openings 82 are configured to direct flow of a fluid exiting spray tip fitting 80 in an outward direction. The outward spraying of fluid directs the energy of the fluid along the sidewall of brew chamber 10 instead of directing the fluid straight upward, thereby reducing or eliminating the potential of the fluid to spilt out of the top upper chamber 10.

As shown in FIGS. 7A and 7B, spray tip fitting 80 includes a pair of opposing, parallel flat surfaces 86, 88 that are used to seat spray tip fitting 80 into a complementary fitting 39 (shown FIG. 5) in upper end 38 of steam chamber 14. As shown FIG. 7B, spray tip fitting 80 also includes a plurality of inlets 90 formed in the bottom surface 92 of spray tip fitting 80. Each inlet 90 corresponds with one of outlet openings 82. Each passage 94 extends at an angle of about 38 degrees from vertical. Passages 94 provide fluid communication between each respective inlet 90 and corresponding outlet opening 82. For clarity, only two passages 94 are shown FIG. 7C.

During the brewing process, fluid enters spray tip fitting 80 through inlets 90 and is directed through passages 94 around perimeter 84 and through outlet openings 82 for discharge into brew chamber 10. After the brewing process is complete, the brewed fluid reverses flow into outlet openings 82, through passages 94 and out of inlets 90 and into straw 13 to steam chamber 14.

In an exemplary embodiment, bottom end 40 of steam chamber 14 might be vertically recessed with a taper to allow bottom end 44 of straw 13 to extend into, but not contact, the bottom end 40. Straw 13 extends through the upper end 38 of steam chamber 14 and to brew chamber 10 such that straw 13 provides fluid communication between steam chamber 14 and brew chamber 10.

The bottom end 40 of steam chamber 14 includes drain valve 15 that allows for draining of steam chamber 14, as well as for dispensing a brewed beverage from brew chamber 10 after the brewing process completes. Steam chamber 14 further includes vent valve 19 employed to vent steam chamber 14, allowing the brewed beverage to drain from steam chamber 14 through drain valve 15 and out of the machine 17 for dispensing. In an exemplary embodiment, vent valve 19 is operatively coupled to microprocessor-controller 6 so that vent valve 19 may be opened at the end of the brewing cycle without requiring manual input from an operator.

Referring back to FIG. 1, steam inlet 46 provides fluid communication between steam control valve 4 and steam chamber 14, and brewing water inlet 48 provides fluid communication between flow meter 5 and steam chamber 14. Cold water inlet 53 provides fluid communication between a cold water supply valve 55 and steam chamber 14. Steam inlet 46, brewing water inlet 48, and cold water inlet 53 all meet at a common inlet 57 that is in direct fluid communication with steam chamber 14. Optionally, vent valve 19 may be in fluid communication with common inlet 57.

Cold water inlet 53 provides a blast of cooling water directly from freshwater inlet 1 into steam chamber 14 in order to cool down any residual steam within steam chamber 14 after the brewing process. This cooling of the residual steam enhances a vacuum that is formed within steam chamber 14 that draws brewed fluid downward from brewing chamber 10 for dispensing, Boiler 2 includes steam outlet 45 providing fluid communication between boiler 2 and steam control valve 4. Boiler 2 also includes heated water outlet 47 providing fluid communication between boiler 2 and water control valve 18. Boiler 2 further includes freshwater inlet conduit 49 providing fresh water to boiler 2 from freshwater inlet 1. Freshwater inlet conduit 49 includes tee 51 that diverts at least a portion of the freshwater around boiler 2 to heated water outlet 47 via cooling water mixer valve 3. The water from heated water outlet 47 and the steam from steam outlet 45 are introduced to brew vessel 9 to provide the brewing liquid. and to brew the beverage.

Microprocessor-controller 6 is operatively coupled to heating element 50 in boiler 2 to control the heating/boiling of water from freshwater inlet 1 and present inside boiler 2. The water flows from freshwater inlet 1 to boiler 2, Freshwater inlet conduit 23 is in fluid communication with both boiler 2 and heated water outlet 47 (via cooling water mixer valve 3 and water control valve 18). Microprocessor-controller 6 is also operatively coupled to cooling water mixer valve 3, water control valve 18, and flowmeter 5 in order to control the flow and temperature of brewing water from boiler 2 into steam chamber 14 according to processes well known by those of ordinary skill in the art.

Additionally, microprocessor-controller 6 is operatively coupled to the steam control valve 4 in order to control the flow of steam from boiler 2 into steam chamber 14. Temperature sensor 7, located in the bottom end of brew chamber 10, is operatively coupled to microprocessor-controller 6 to transmit temperature information inside brew chamber 10 to microprocessor-controller 6 so that microprocessor-controller 6 might regulate the temperature inside brew chamber 10 via steam control valve 4 and water control valve 18. Feedback from temperature sensor 7, as well as flowmeter 5, is used by microprocessor-controller 6 to regulate operation of cooling water mixer valve 3, steam control valve 4, and water control valve 18 to regulate the temperature of the brewing liquid inside brew vessel 9. Microprocessor-controller 6 is also operatively coupled to cold water valve 55 to regulate operation of cold water valve 55.

Microprocessor-controller 6 is also operatively coupled to user interface 8. An operator manipulates user interface 8 in order to instruct microprocessor-controller 6 of the process to brew a beverage in brew vessel 9 according to desired parameters, such as, for example, the volume of the beverage to be brewed, the final temperature of the brewed beverage, agitation of the brew, the duration of time that the beverage brews inside brew vessel 9, and other associated parameters.

In an exemplary embodiment, user interface 8 might include reader 52 that reads electronic information associated with a particular user. For example, reader 52 may be a card reader that is used to read an electronic card that is swiped through reader 52. Alternatively, reader 52 may be an REID device that is used to wirelessly read an electronic device, such as a key fob, that is placed near reader 52 to extract information from the key fob regarding desired brewing parameters. Electronic information associated with a particular user may include, but is not limited to, the name of the user, the type of beverage that the user prefers, the preferred volume of beverage (i.e. 8 ounces, 12 ounces, 16 ounces), a temperature range of the beverage, quantity of creamer, and whether the user prefers any added flavoring, such as, for example, whipped cream and/or sugar.

Microprocessor-controller 6 is also operatively coupled to a network communications port 16. Network communications port 16 provides a communications path between microprocessor-controller 6 and an external location such as, for example, a host server, via the Internet. Network communications port 16 allows for input to microprocessor-controller 6 via an alternative location other than user interface 8. For example, a customer may be able to place an order for a brewed beverage via network communications port 16 so that the beverage might be ordered and/or brewed before the customer physically arrives at the brewing location. Network communications port 16 might also allow for download of information from microprocessor-controller 6 to a remote location. Such information may include the number and types of brewing processes performed by machine 17, as well as customer information obtained via. reader 52.

Figure 8:
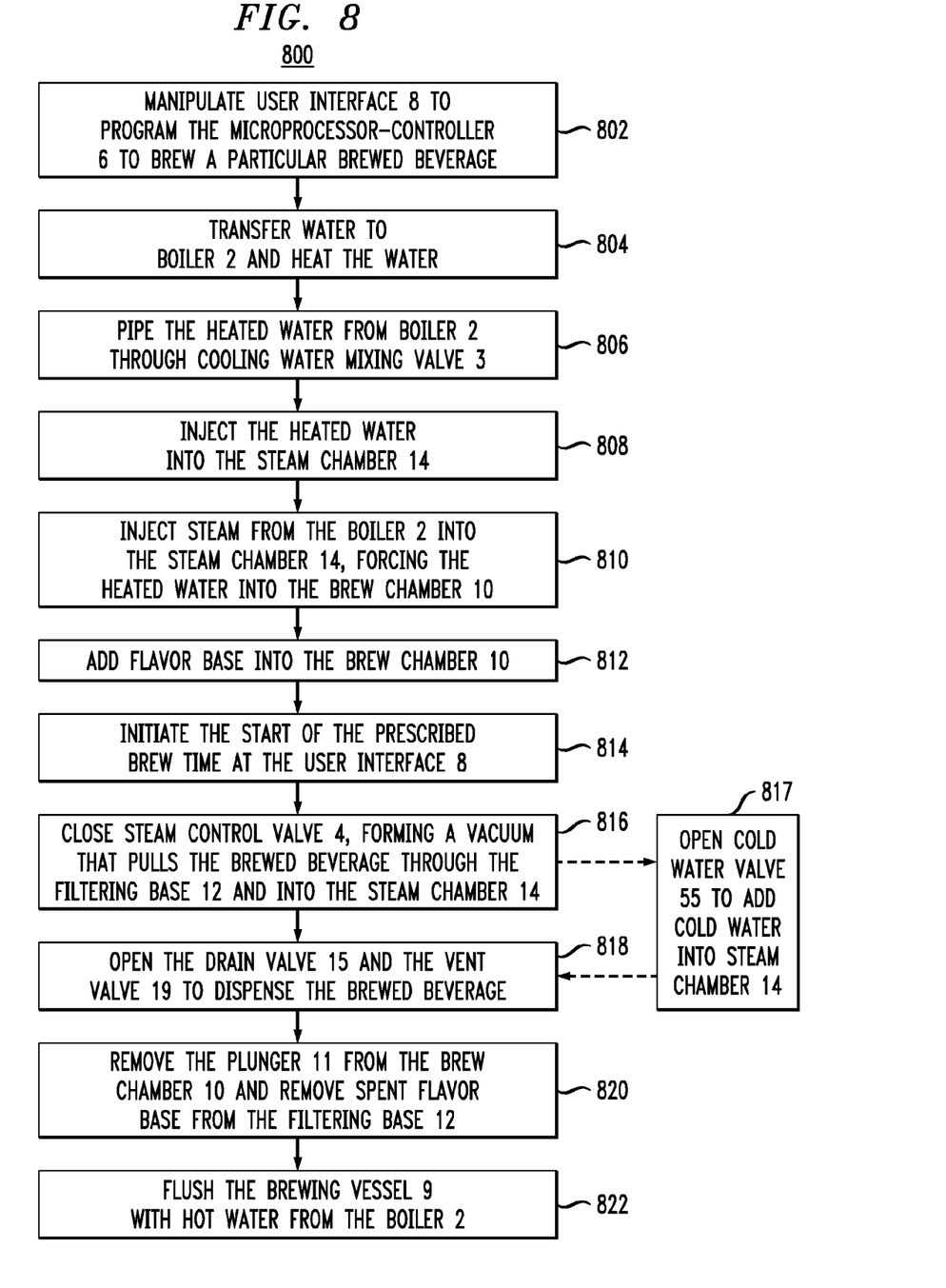
FIG. 8 shows a flow chart illustrating an exemplary operation of the machine disclosed here and depicted in FIGS. 1-7C.

Referring to flowchart 800 in FIG. 8, in operation of machine 17, an operator manipulates user interface 8 at step 802 in order to program microprocessor-controller 6 to brew a particular brewed beverage using machine 17. The user-specified brew parameters such as, but not limited to, brew temperature, brew time, brew volume, and brew agitation are input via the user interface 8. User interface 8 relays the brew parameters to microprocessor-controller 6, which further controls the valves 3, 4, 18, thereby achieving desired brew parameters and providing automation of the processes.

At step 804, machine 17 receives fresh water through the water inlet valve 1, which passes the fresh water into boiler 2. Optionally, a pump (not shown) may be used to pump water from boiler 2 to brew vessel 9. In an exemplary embodiment, however, the water may be supplied by a pressurized public water source. In another exemplary embodiment, the water may be supplied by a user-filled gravity fed water tank (not shown). Water in boiler 2 is heated to a temperature that is sufficient to generate the substantial pressure and temperature necessary to accomplish brew cycles. In an exemplary embodiment, boiler 2 may keep the water to between about 99° C. (about 210° F.) and about 132° C. (about 270° F.), with the pressure of between about 1 bar and about 2 bar. The heated water also creates steam pressure. At step 806, heated water from boiler 2 is piped to cooling water mixing valve 3 where the heated water subsequently cooled to a temperature slightly below the user's specified brew temperature by additional water supplied through freshwater inlet 1 that bypasses boiler 2 via (bypass) tee 51. At step 808, the user-specified volume and temperature of water flows out of boiler 2 and through mixing valve 3, where the water is injected into steam chamber 14 through brewing water inlet 48 via input water control valve 18. The accuracy of this process at step 808 might be achieved by a control loop between microprocessor-controller 6, flow meter 5, temperature sensor 7, and input water control valve 18, At step 810, steam control valve 4, controlled via microprocessor-controller 6, opens, allowing the flow of high pressure steam into steam chamber 14 through steam inlet 46. Due to the high pressure in steam chamber 14, the water in steam chamber 14 is pushed up through straw 13, forcing open valve 62, thereby allowing the water to flow through filtering base 12 and into brew chamber 10. While the water is in brew chamber 10, the steam flow continues into steam chamber 14 and vents up straw 13, past valve 62, through filtering base 12, and into the water in brew chamber 10. The flow of steam into steam chamber 14 and its continued flow through straw 13 into brew chamber 10, transfers heat to and agitates the water in brew chamber 10. At step 812, once the user-specified water temperature threshold is reached in brew chamber 10, as measured by the temperature sensor 7, microprocessor-controller 6 transmits a signal to steam control valve 4 to throttle back the supply of steam to steam chamber 14, allowing valve 62 to close, thereby preventing additional steam from entering brew chamber 10 so that an operator can remove lid 32 to add ground coffee or tea leaves or other solid flavor bases for mixing into the water of the brew chamber 10.

At step 814, after the solid flavor base is added to the brew chamber 10, the operator initiates the start of the prescribed brew time at the user interface 8. During the brew time, steam is reintroduced to brew chamber 10 and the amount of steam flow to brew chamber 10, via steam chamber 14 and straw 13, is regulated by microprocessor-controller 6, which transmits electronic signals to operate steam control valve 4 in order to achieve the user's brew parameters, which are provided at user interface 8. At step 816, once the specified brew time is reached, .microprocessor-controller 6 transmits a signal to close steam control valve 4, thus eliminating the flow of pressurized steam into the steam chamber 14. The condensing steam generates a pressure loss in steam chamber 14, thereby forming a vacuum that pulls the brewed beverage down through filtering base 12, thereby separating the solid flavor base from the beverage.

Optionally, in step 817, microprocessor-controller 6 may open cold water valve 55 to allow cold water from freshwater inlet 1 into steam chamber 14 in order to cool residual steam within steam chamber 14 and to generate a vacuum that draws the brewed beverage from brew chamber 10, thereby speeding up the extraction time of brewed beverage from machine 17 and generates a higher extraction pressure. The addition of the cold water also allows the operator of machine 17 to maintain a more precise temperature in brew chamber 10.

The brewed beverage flows down through straw 13 and into steam chamber 14, At step 818, once the majority of the brewed beverage has reached steam chamber 14, the brew vessel's vent valve 19 opens electronically via an electronic signal transmitted from microprocessor-control 6 and the brew vessel drain valve 15 is manually opened by the operator, allowing the beverage to drain into a cup (not shown) below, As the beverage is draining into the cup below, at step 820, the operator pulls plunger 11 with the spent grounds atop, up and out of brew chamber 10 further clearing brew chamber 10 of the spent flavor base. The operator rinses out plunger 11 with tap water and clears it of any flavor base debris. At step 822, once the beverage has emptied from steam chamber 14 into the cup, the operator places lid 32 on top of brew chamber 10, pulls up plunger 11 so that filtering base 12 is at the top end 21 of brew chamber 10, and flushes brewing vessel 9 with a blast hot water from boiler 2. The water from the flush cycle is allowed to drain out the bottom of steam chamber 14 through drain valve 15 and into the machine's drain board 20 (shown in FIG, 2) and out the machine's drain tube (not shown). Upon completion of the rinse cycle, the operator replaces plunger 11 into brew chamber 10 and brew vessel 9 is ready to begin another brew cycle.

There are embodiments of the invention disclosed here with a plurality of microprocessors. In certain embodiments of the invention disclosed here, the microprocessor is connected to a network that allows multiple devices to set brew specifications and initiate brew processes. In certain embodiments, networking is wireless white in certain embodiments, networking is wired.

Certain embodiments of the inventions disclosed here reach the desired temperature much more quickly than a conventional siphon coffee maker does. Certain embodiments of the inventions disclosed here have much more precise temperature control than a conventional siphon coffee maker does. Typical embodiments can control the temperature within 0.5 degree centigrade. However, other embodiments of the invention have different precisions of temperature control. For non-limiting examples, there are embodiments of the invention in which the temperature is regulated within 1 degree centigrade, embodiments of the invention in which the temperature is regulated within 2 degrees centigrade and embodiments of the invention in which the temperature is regulated within 0.2 degree centigrade.

Certain embodiments of the invention disclosed here allow more efficient cleaning and rinsing than a conventional siphon coffee maker. Certain embodiments of the invention disclosed here allow superior methods for separating spent coffee from brewing liquid compared. with conventional siphon coffee makers.

Certain embodiments of the invention disclosed here allow customizable process automation. For non-limiting example, each cup of coffee or tea can be easily brewed to an individual customer's specifications via automation. Additionally, certain embodiments of the invention disclosed here are more suitable for office use and/or home use than conventional siphon coffee makers.

Certain embodiments of the inventions disclosed here are more suitable for high volume commercial used than conventional siphon coffee makers.

In another embodiment of this invention, some or all of the valves could be manually operated and its entire operation could be partially automated or incorporate no automation at all.

In yet another embodiment of this invention, the boiler could be heated by a means other than electricity and incorporate manual valves and operate entirely. free of electricity.

In still another embodiment of this invention, the boiler can be omitted in an alternative heat source, such as, for example and induction burner (not shown), can be used. For embodiment of the present invention with an induction burner, such an induction burner could be incorporated into bottom end 40 of steam chamber 14.

Although specific embodiments described above are intended for brewing coffee, other extractions are possible. One non-limiting example is brewing of tea. However, other extractions into hot water are possible with embodiments of the invention disclosed here. Moreover, there are embodiments of the invention disclosed here intended for use extracting into a liquid other than water.

In still another embodiment of this invention, the brewing machine may be equipped with an auxiliary steam wand and or an auxiliary hot water spigot.

Certain embodiments of the invention disclosed here are a hot liquid extraction system including a vessel, a controllable steam and water source external from the vessel which heats the liquid of the vessel, a plunger assembly disposed within the vessel operable to filter and remove a solid from the brewed beverage, and a valve to dispense the filtered beverage from the base of the brew vessel.

Certain embodiments of the invention disclosed here are similar to a conventional siphon brewing system comprising a vessel, but including an external controllable steam and hot water source, valves operable to regulate water flow and steam into the brewing vessel, and a plunger operable to separate a brewed liquid from a flavor base and to remove a spent flavor base from the system.

Certain embodiments of the invention disclosed herein might possess an additional gas inlet 98 (shown in FIG. 1) to steam chamber 14 that is in fluid communication with a gas supply of non-toxic liquids, such as, for example, food grade nitrogen and/or carbon dioxide, which can provide an additional and/or alternative source of agitation (potentially substituting for steam-based agitation) and/or cooling for the heated liquid The gas supply and the steam disclosed herein can be generally referred to as an agitation fluid. Microprocessor-controller 6 is also operatively coupled to gas inlet 98 to admit the gas into steam chamber 14 at the proper time during the brewing process.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" means serving as an example, instance, or illustration, Any aspect or design described herein as "exemplary" is not necessarily to be construed as (preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances, In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Aspects of the present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

Aspects of the present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

No claim element herein is to be construed under the provisions of 35 U.S.C. §112, sixth paragraph, unless the element is expressly recited using the phrase "means for" or "step for."

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of brewing a beverage, the method comprising the steps of:
   providing a heated fluid into a lower chamber;
   delivering an agitation fluid into the lower chamber with the heated fluid within the lower chamber such that the agitation fluid forces the heated fluid into an upper chamber;
   delivering the agitation fluid into the upper chamber;
   adding a flavor base into the upper chamber on a filtering base positioned in the upper chamber, wherein the filtering base is configured to tightly engage an inner sidewall of the upper chamber, wherein the filtering base is movable within the upper chamber, and wherein the filtering base is coupled to a plunger;
   combining the heated fluid with the flavor base, comprising agitating the heated fluid and flavor base with the agitation fluid, increasing a temperature of the heated fluid to a desired temperature, and forming a brewed beverage; and
   dispensing the brewed beverage.

2. The method according to claim 1, further comprising the step of, prior to dispensing the brewed beverage, siphoning the brewed beverage from the upper chamber into the lower chamber.

3. The method according to claim 2, wherein the siphoning step comprises condensing the agitation fluid in the lower chamber.

4. The method according to claim 1, wherein the step of delivering the agitation fluid into the lower chamber further comprises forcing the heated fluid through a conduit, the conduit having a first open end disposed at a lower end of the lower chamber and the second open end disposed at a lower end of the upper chamber.

5. The method according to claim 4, further comprising the step of after forcing the heated fluid through the conduit, releasably sealing the heated fluid in the upper chamber.

6. The method according to claim 1, further comprising the step of, after dispensing the brewed beverage, removing the flavor base from the upper chamber.

7. The method according to claim 6, wherein removing the flavor base comprises moving the filtering base upward from a bottom end of the upper chamber to an upper end of the upper chamber using the plunger.

8. The method according to claim 6, further comprising the step of, after removing the flavor base in the upper chamber, rinsing the lower chamber and the upper chamber with heated water, wherein the step of rinsing the lower chamber and the upper chamber comprises moving the filtering base to an upper end of the upper chamber using the plunger and delivering a fluid from a conduit coupled with at least one of the upper chamber and the lower chamber into the at least one of the upper chamber and the lower chamber.

9. The method according to claim 1, wherein the dispensing step comprises opening a drain valve and opening a vent valve.

10. The method according to claim 1, further comprising, setting a temperature for the brewed beverage to the desired temperature and wherein the step of providing the heated fluid into the lower chamber comprises heating the heated fluid to a temperature less than the desired temperature.

11. The method according to claim 10, wherein the step of providing the agitation fluid into the upper chamber includes regulating the temperature of the heated fluid at the desired temperature and terminating brewing of the brewed beverage.

12. The method according to claim 6, wherein the step of providing the heated fluid comprises providing a user-specified volume of the heated fluid.

13. The method according to claim 6, wherein the step of providing the agitation fluid comprises providing a user-specified volume of the agitation fluid.

14. The method according to claim 6, wherein the agitation fluid comprises a gas.

15. The method according to claim 14, wherein the agitation fluid comprises steam.

16. The method according to claim 1, wherein the agitation fluid is at a higher temperature than the heated fluid.

* * * * *